US010601363B1

(12) United States Patent
Rubin

(10) Patent No.: US 10,601,363 B1
(45) Date of Patent: *Mar. 24, 2020

(54) DEVICE AND METHOD OF A ROTATABLE PHOTOVOLTAIC PANEL MOUNT

(71) Applicant: Kim Rubin, Menlo Park, CA (US)

(72) Inventor: Kim Rubin, Menlo Park, CA (US)

(73) Assignee: Kim Rubin, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,326

(22) Filed: Oct. 18, 2019

Related U.S. Application Data

(63) Continuation-in-part of application No. 16/421,144, filed on May 23, 2019, now Pat. No. 10,461,684.

(51) Int. Cl.
  *H02S 20/30* (2014.01)
  *H02S 20/23* (2014.01)

(52) U.S. Cl.
  CPC .............. *H02S 20/30* (2014.12); *H02S 20/23* (2014.12)

(58) Field of Classification Search
  CPC .................................. H02S 20/30; H02S 20/23
  See application file for complete search history.

(56) References Cited

U.S. PATENT DOCUMENTS

| | | | | |
|---|---|---|---|---|
| 4,371,139 A * | 2/1983 | Clark | ...................... | F24S 20/67 248/237 |
| 4,421,943 A * | 12/1983 | Withjack | ................ | H02S 20/30 136/246 |
| 6,058,930 A * | 5/2000 | Shingleton | ............ | F24S 30/425 126/600 |
| 8,324,496 B1 * | 12/2012 | Gross | ....................... | F24S 40/85 136/246 |
| 8,492,645 B1 * | 7/2013 | Strahm | .................. | H01L 31/054 136/244 |
| 8,536,442 B2 * | 9/2013 | Stancel | .................. | F24S 25/632 136/251 |
| 8,991,115 B2 * | 3/2015 | Hubbard | ................... | A62C 2/24 52/173.3 |
| 9,799,786 B2 * | 10/2017 | Kim | ........................ | H02S 30/10 |
| 10,024,579 B1 * | 7/2018 | Govar | ..................... | F24S 80/00 |
| 10,461,684 B1 * | 10/2019 | Rubin | ..................... | H02S 20/30 |

(Continued)

OTHER PUBLICATIONS https://www.quickmountpv.com/products/qrail.html?utm_source=websitehomepage&utm_medium=banner&utm_campaign=QRail ; retrieved May 23, 2019.

(Continued)

*Primary Examiner* — Rodney Mintz
(74) *Attorney, Agent, or Firm* — Kim Rubin Patent Agent

(57) ABSTRACT

A device and method for a rotatable photovoltaic (PV) panel mount is described. A moving frame, comprising a standard PV panel, connects via a hinge to a fixed frame. In an "operative" position, the moving frame and its PV panel are coplanar with a larger, fixed array of PV panels. A spring between the fixed frame and the moving frame powers the moving frame to rotate around the hinge pivot from horizontal (operative) to vertical (roof access), when an emergency handle releases a latch. The roof access position provides unobstructed roof access to a portion of the roof previously under the PV panel. A damper limits speed of motion of the moving frame. Embodiments include an additional horizontal (folded) position, on top of an adjacent PV panel.

19 Claims, 9 Drawing Sheets

(56) References Cited

U.S. PATENT DOCUMENTS

| | | | | |
|---|---|---|---|---|
| 2007/0151594 A1* | 7/2007 | Mascolo | .................. | H02S 20/23 |
| | | | | 136/245 |
| 2008/0040990 A1* | 2/2008 | Vendig | .................... | H02S 20/32 |
| | | | | 52/173.3 |
| 2009/0120016 A1* | 5/2009 | Hon | ........................ | H02S 20/00 |
| | | | | 52/173.3 |
| 2010/0193013 A1* | 8/2010 | Kong | ...................... | H02S 20/30 |
| | | | | 136/251 |
| 2010/0243023 A1* | 9/2010 | Patton | .................... | H02S 20/24 |
| | | | | 136/244 |
| 2010/0269888 A1* | 10/2010 | Johnston, Jr. | ........... | H02S 20/30 |
| | | | | 136/251 |
| 2010/0269889 A1 | 10/2010 | Reinhold et al. | | |
| 2012/0318322 A1* | 12/2012 | Lanyon | .................. | H02S 20/23 |
| | | | | 136/244 |
| 2013/0205692 A1* | 8/2013 | Hubbard | .................. | A62C 2/24 |
| | | | | 52/173.3 |
| 2013/0240008 A1* | 9/2013 | Baker | ...................... | H02S 20/00 |
| | | | | 136/244 |
| 2014/0060624 A1* | 3/2014 | Kim | ........................ | H02S 30/10 |
| | | | | 136/251 |
| 2017/0229997 A1* | 8/2017 | Van Otten | .............. | F16M 11/12 |

OTHER PUBLICATIONS https://www.ironridge.com/pitched-roof-mounting/360view/; retrieved May 23, 2019.

https://www.panelclaw.com/clawfr/#clawFR%2010D; retrieved May 23, 2019.

https://unirac.com/roofmount/rm10/; retrieved May 23, 2019.

* cited by examiner

DEVICE AND METHOD OF A ROTATABLE PHOTOVOLTAIC PANEL MOUNT

This application is a continuation-in-part of application Ser. No. 16/421,144, filed 23 May 2019.

BACKGROUND

Photovoltaic (PV) panels and panel arrays are commonly used on residential and commercial roofs to generate electricity. Individual panels are typically secured to a roof using first, a set of roof penetration mounts each comprising a vertical post; second, a set of rails, or struts, that attach to the penetration mount posts; and third, a set of panel clamps that secure an array of PV panels to the struts. Two sets of parallel struts may be used, typically perpendicular to each other. All this hardware is in fixed positions on a roof.

Typically, fire codes or building codes have a requirement that a portion of the supporting roof remain clear of PV panels, mounting hardware and other obstructions so that the roof may be accessed or penetrated rapidly by a firefighter. For example some codes require a 36" unobstructed portion from the edge of a residential roof, or 48" unobstructed from any roof edge or penetration on a commercial roof. As a result, prior art installation of PV panels leave large portions of roofs empty of PV panels, thus limiting the amount of power than can be generated by such installations.

SUMMARY OF THE INVENTION

Embodiments of this invention overcome the weaknesses of prior art. A PV panel mount, mechanical system and a method of use are described that permit an operative PV panel near the edge of a roof to simply and rapidly be rotated away from the roof edge to permit emergency access to a roof access region previously covered or blocked by the panel or related panel hardware.

Embodiments comprise a moving frame, which holds a standard PV panel, a hinge, a spring attached to the moving frame that rotates the frame and its PV panel around the hinge, a damper to limit speed of motion, a release handle and release latch to hold the frame in an operative, typically flat, position until released. The release handle may connect to, or be, a release trigger that releases the moving frame from covering a portion of the roof to uncovering a portion of the roof, called the roof access region. In this way, an obstructed roof access region becomes immediately unobstructed in an emergency. Embodiments include two release handles, one near the folding panel and one near the ground. The release handles may be linked to an alarm system, allowing the alarm system to automatically release the panel, or pulling a release handle automatically activates an alarm. Handles may also be linked to a power shutoff so that a single emergency action of pulling a handle also disconnects power to a full roof PV array, providing additional safety to personnel.

Embodiments include devices with two stable positions: operative and vertical. In the operative position, the PV panel is co-planar with other PV panels in a roof array. Its power generation operates effectively identical to the other PV panels. Although the PV panels in the array may either horizontal or angled towards the sun, this position is generally referred to as "flat."

In the vertical position, the frame and its PV panel rotate to a vertical position, thus allowing immediate access to the unobstructed area of the roof just previously covered by the frame and PV panel. Such an unobstructed area may be required or desirable next to an edge of the roof or adjacent to a roof penetration. The vertical position is nominally a 90° rotation from the operative position, noting that operative PV panels may be angled to better catch sunlight or to be parallel to a roof surface.

Some embodiments include an alternative second position of the frame: "folded." In the folded position the frame continues to rotate around its hinge, past the vertical position, until it is folded over, now upside down, on top of an adjacent PV panel.

Motion from the operative position to the vertical position, and optionally on to a folded position, is provided by a spring. Speed of motion is limited by a damper.

It is convenient to think of the operative position as "face up" and the folded position as "face down," 180° from the operative position.

Compliant feet on the frame are used to assure that there is no damage to the underlying roof or an underlying adjacent PV panel in both the operative and folded positions.

A latch is used to hold the frame in its operative position, held against the rotational torque from the spring. A release mechanism may be either manual or electric. A manual release handle may be either proximal to the latch or remote, such as at the edge of the roof or on the side of the building. Such a release handle should be well-marked, such as bright red, so as to be immediately recognizable to emergency crews.

A manual release handle may release more than one PV panel frame on the roof from its operative to vertical or folded position. In this way, a single motion of a release handle may clear entire areas of the roof of obstruction.

A manual release handle may also disconnect, mechanically, electrically or electronically, power from the PV panel array. This provides additional safety to emergency personnel.

A release may also be provided electrically, such as by the use of a solenoid. The permits panels to be released from their operative position from a remote control point.

The release handle, other release trigger, or a remote control point to cause release may be used for emergency roof access.

Embodiments include the ability to restore a frame from its folded or vertical position to its operative position by simply moving the frame manually back to the operative position where it re-engages with the latch.

Embodiments include a pre- or post-installation option to select either the two stable positions of the frame as either operative and vertical, or as operative and folded.

Ideally, no tools are required to either release the PV frame from its operative position or to restore the PV frame to its operative position.

Claimed embodiments include a frame inclusive of a PV panel; a frame adapted to accept a PV panel; a kit of parts; a method of installation, and a method of operation.

BRIEF DESCRIPTION OF THE DRAWINGS

FIG. 3 also shows an "over the roof edge" release cable.

DETAILED DESCRIPTION

Scenarios, drawings, drawing descriptions, alternatives, and options are non-limiting, exemplary embodiments.

The technical problem to solve is: how to provide rapid, simple, reliable access to a roof surface that is normally covered by an operative PV panel. Such access is often required in emergencies, such as a fire. There are additional requirements for a practical solution. The assembly must be installable with minimal additional instructions using skills and tools now used regularly by PV panel array installers. Operation of embodiments by firefighters must be obvious, even with no prior experience or training on such embodiments. Embodiments should continue to function properly with no maintenance for ten to twenty years. Operation should not put anyone at risk of injury nor cause any damage.

A summary of elements, in one embodiment, includes the following.

Figure 1:
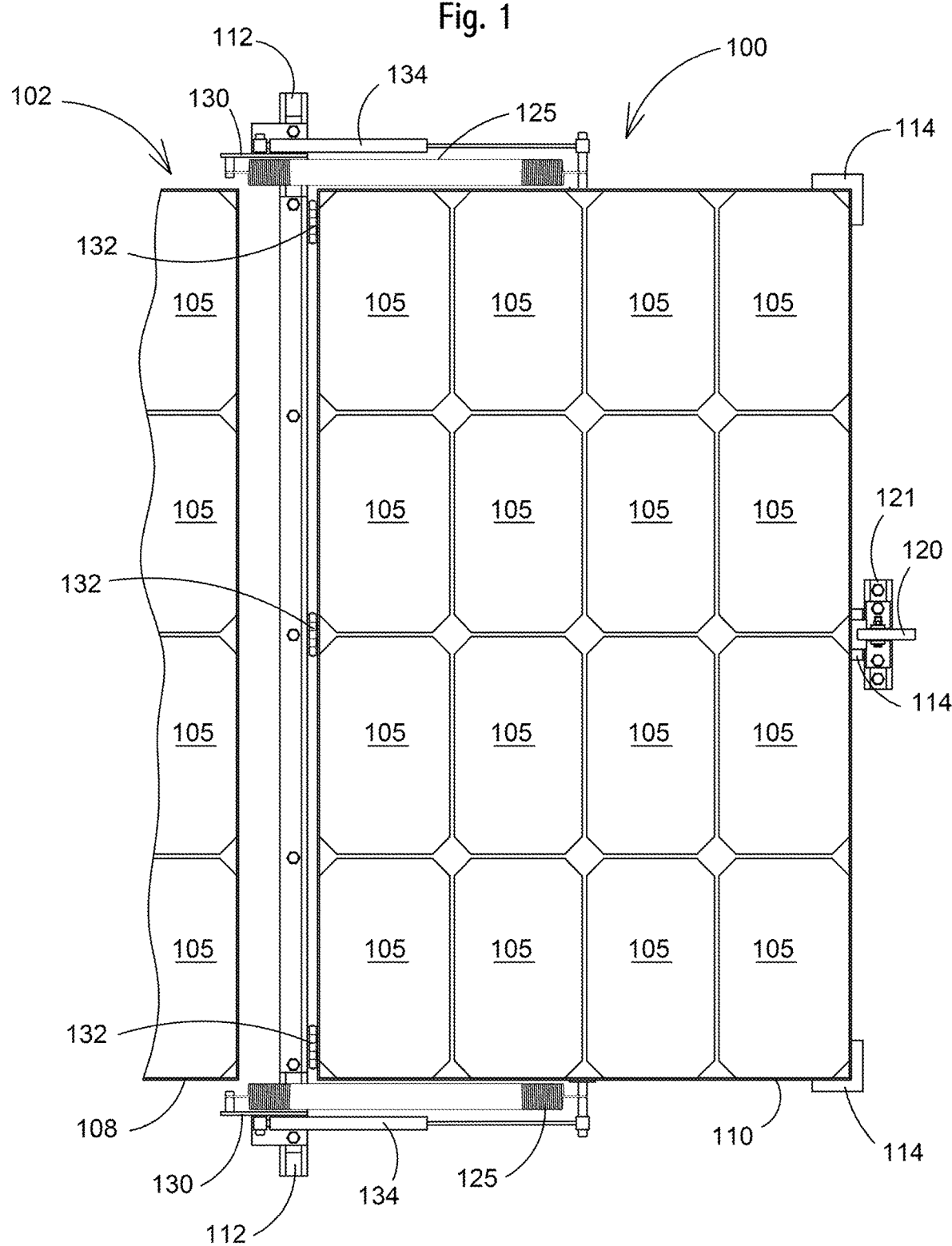
FIG. 1 shows a top view of a movable PV frame with a PV panel installed and secured in an operative position.

Turning first to FIG. 1, we see a top view, also called a plan view, of a and embodiment 100 with a PV panel installed on the frame. 105 shows individual solar cells on both the PV panel on the frame of this embodiment and in an adjacent PV panel 102 as part of an adjacent or proximal larger, fixed PV array, typically on a roof of a residence, commercial or industrial building. The roof may be flat or sloped. The PV panels may be parallel to the supporting roof or angled from the roof. This figure view is normal to the surface of the PV panel or normal to the plane of the frame. This figure also shows two springs 125, two spring brackets 130, and two dampers, here shock absorbers 134. Three hinges are shown 132. Hinges may be of any form that allows the movable frame assembly 200 to rotate around a hinge pivot on either a fixed mount on the roof or an edge of an adjoining PV panel. The hinges 132 define a pivot axis, also called a hinge axis. Shown are three feet 114, typically secured to the movable frame assembly 110 that allow the right side assembly to rest on the roof in the operative position. When the movable frame assembly 110 is in the vertical or folded position, the feet are off the roof, leaving an unobstructed area. There may be more or fewer than three feet 114. Feet may also be used to prevent damage from the moving frame to an underlying PV panel in the folded position. 120 shows a latch and release handle. Here, they are adjacent to one edge of the panel, opposing the hinges and pivot axis edge. However, a latch may be on an extension to the panel so that when the panel is raised to the vertical or folded position the roof is completely clear of obstructions, including the latch and release handle. For example, the latch may be positioned at or beyond a nearest edge of the roof. 120 shows a release handle. This handle may be proximal to the latch or it may be mechanically extended from a moving frame assembly 110, such as by the use of a cable, rod or bar, or may be remote where it then operates the latch via a mechanical cable, electrically or electronically, such by the use of one or more solenoids. The frame may be called a moving frame, moving frame assembly or rotatable frame. A pilot or warning light may be attached or proximal to the moving frame assembly 110, release handle 120, or an adjacent PV panel. The light may provide attention or visibility to the embodiment, in any position. 121 shows a roof top release handle support bracket. 108 shows a fixed frame as part of an adjacent PV panel array. 112 shows a mount for the spring bracket 130.

Figure 2:
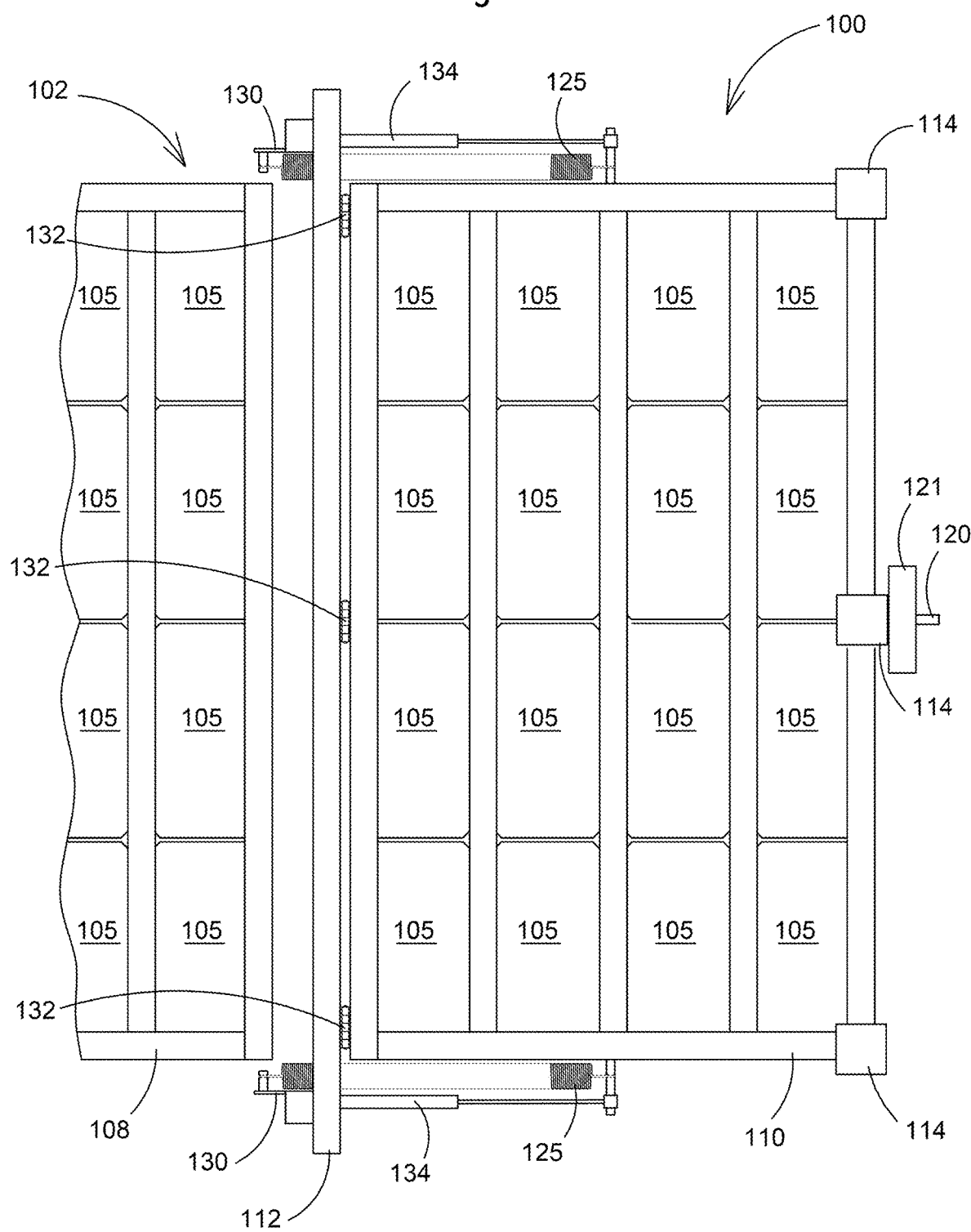
FIG. 2 shows a bottom view of a frame with no attached PV panel.

Turning now to FIG. 2, we see a bottom view an embodiment. The view shown in the figure is nominally of an installed embodiment, including mounting adjacent to a PV panel in a fixed array. However, on a roof, such a bottom view would not be directly visible. In that sense, this is an artificial view. Reference designators in this figure are for the same-identified elements described elsewhere herein. Here, the base of the feet 114 are visible. Additionally, in one embodiment the PV panel is on top of the frame, so in the previous figure the frame itself is not visible or only partially visible. In this figure, the moving frame assembly 110 is more visible. A release handle may also be called a release trigger, or an emergency handle. The handle may activate mechanically, electrically, or electronically, local or remote, a separate release trigger.

Figure 3:
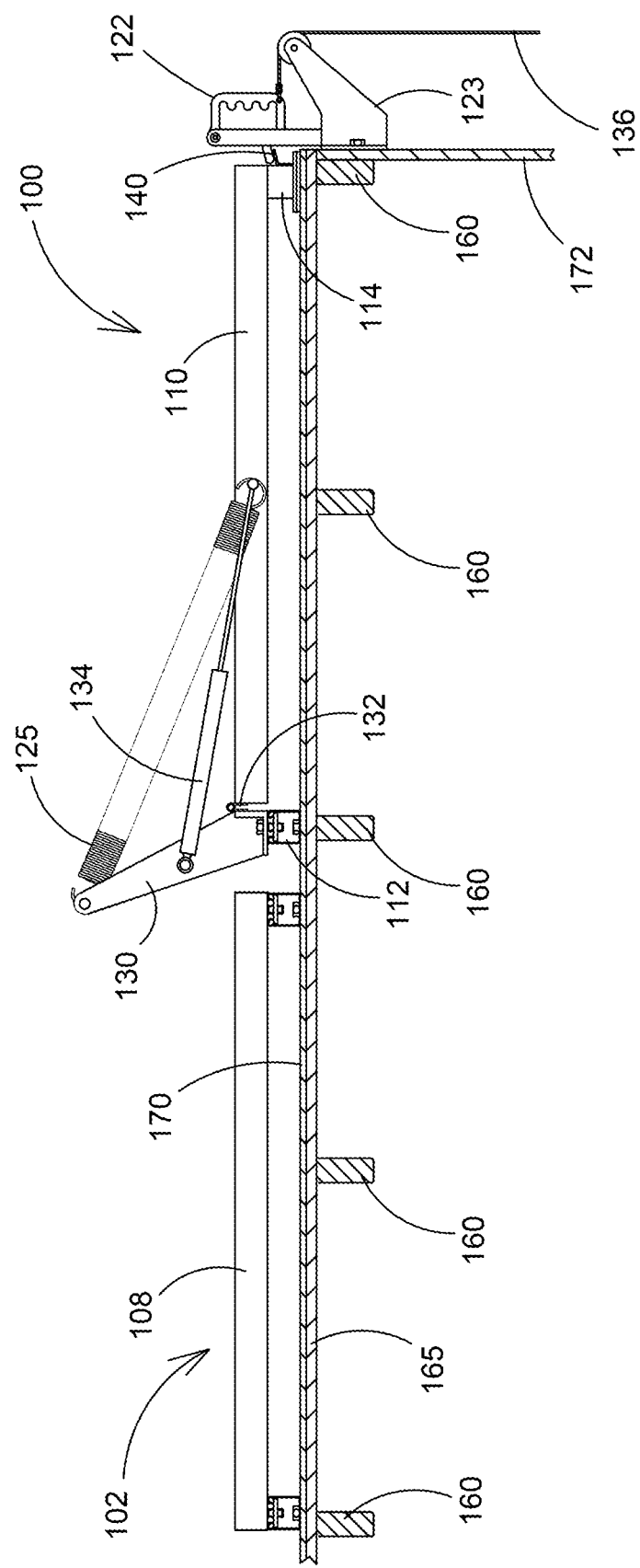
FIG. 3 shows a side view, where the base, frame, spring, spring mount, damper, release handle and hinge pivot are visible.

Turning now to FIG. 3, we see a side view of an embodiment, in an operative position, showing a moving frame assembly 110, spring 125, a hinge and pivot axis 132, a spring mounting bracket 130, and a damper, such as a shock absorber or strut 134. Reference designators in this figure are for the same-identified elements described elsewhere herein. Also shown is roofing 170, underlayment 165 and roof joists 160. In this figure the release handle 122 is off the side of the roof to leave the access portion of the roof covered by the embodiment when operational, unobstructed when the embodiment is in the vertical or folded position. A release handle bracket 123 is shown on the wall. In this embodiment, the bracket 123 provides both mounting support for the release handle 122 and a support and pulley for the release cable 136. Here the cable is shown as mechanical. In other embodiments it may be an electrical or electronic cable. In yet other embodiments a trigger signal to release the latch 140 may be a wireless signal, such as via WiFi, Bluetooth, cellular data, or other wireless transmission protocol. Such a signal may come from a fire alarm system; it may come from a fire department, heat or smoke detector, electrical malfunction detection circuit, local or remote manual trip, or another source. In this figure, the moving frame assembly 110 is shown in the operative position. The tension or extension spring 125 is in an extended state, providing rotational torque to the frame around the pivot axis. The spring shown 125 is extended in this embodiment. In other embodiments, other springs or torque generators may be used, such as a torsion spring, a compression spring, a leaf spring or a pressurized gas cylinder. Springs and dampers may be used singly, or in pairs such as shown in FIGS. 1 and 2, or in larger numbers. The number of springs and dampers does not have to be the same and they do not need to mounted using the same mounting brackets or proximal to each other. In one embodiment, a spring and a damper may be a single sealed unit.

Figure 4:
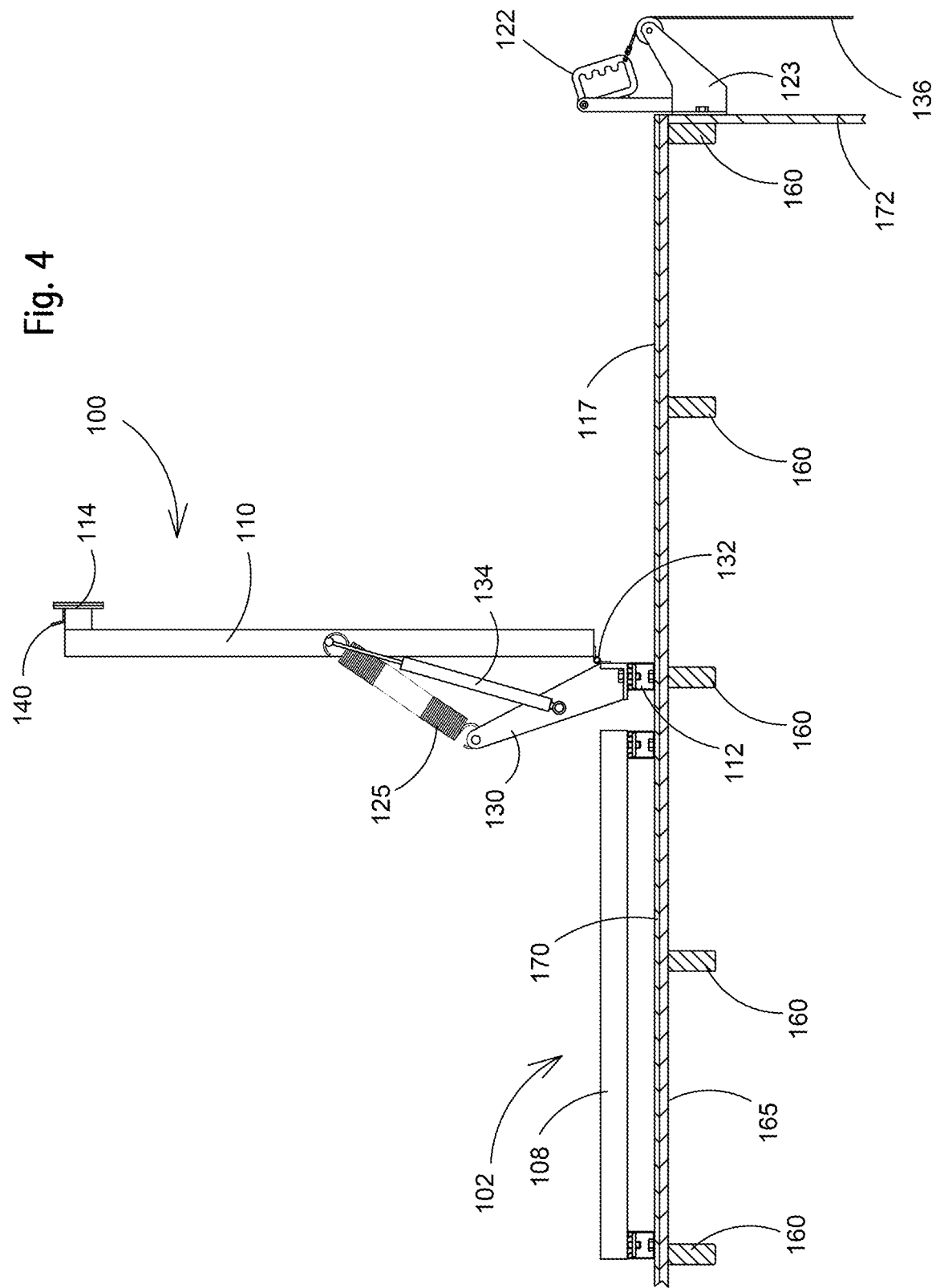
FIG. 4 shows a side view of a frame in a vertical position.

Turning now to FIG. 4, we see a side view of the moving frame assembly 110 in a vertical position, creating an obstruction free roof access region 117. Reference designators in this figure are for the same-identified elements described elsewhere herein. Here, the extension spring 125 is in its relaxed state. The spring 125 is at its shortest length when the frame is in its vertical position. Any rotational movement of the moving frame assembly 110 causes the spring 125 to elongate, providing a torque to rotate the moving frame assembly 110 to its vertical position. Damper 134 limits rotational speed.

Ideally, the spring 125, or its equivalent, provides sufficient rotational torque to the moving frame assembly 110 with a PV panel attached so as to lift the panel from its still, operational position to the vertical position. Once in the vertical position, gravity is no longer providing a rotational torque or force to cause rotation on the moving frame assembly 110. The spring 125 provides sufficient restoring torque toward vertical to maintain the panel in the vertical position.

In another embodiment, when the rotating frame passes through vertical it continues its rotational motion towards an optional folded position. The arrangement and selection of elements is such that the spring does not prevent gravity from moving the moving frame assembly 110 from vertical to the folded position. However, it does provide some torque to keep the moving frame assembly 110 from "slamming" into the folded position. In addition, damper 180 limits rotational speed from the vertical position to folded position. Feet on the moving frame 110 may be used to further dampen a landing of the moving frame on an underlying PV panel. Ideally, the torque from gravity on the moving frame assembly 110, in the folded position, is slightly greater than the torque from the spring 125, permitting the moving frame assembly 110 to remain in the folded position.

Ideally, when released by the release handle 122, the moving frame assembly 110 moves from the operational position to the vertical position. In some embodiments it then stays in the vertical position. In another embodiment, the rotational kinetic energy of the moving frame assembly 110 moves it through the vertical position, and it then continues rotating to the folded position. In yet another embodiment, the moving frame assembly 110 is stable in the vertical position if it is not already moving. For example, an installer, inspector, owner or firefighter might choose to manually move the moving frame assembly 110 into the vertical position. This can be accomplished by moving it from the folded position, where it may or may not have a separate latch for that position, or from the operational position once the release handle 122 is activated and latch 140 is opened. Optional latch or latches may be used in the vertical or folded positions to safely maintain those positions. Latches may be mechanical, magnetic, or electric. Latches may be integrated with a sensor or pilot light.

Figure 6:
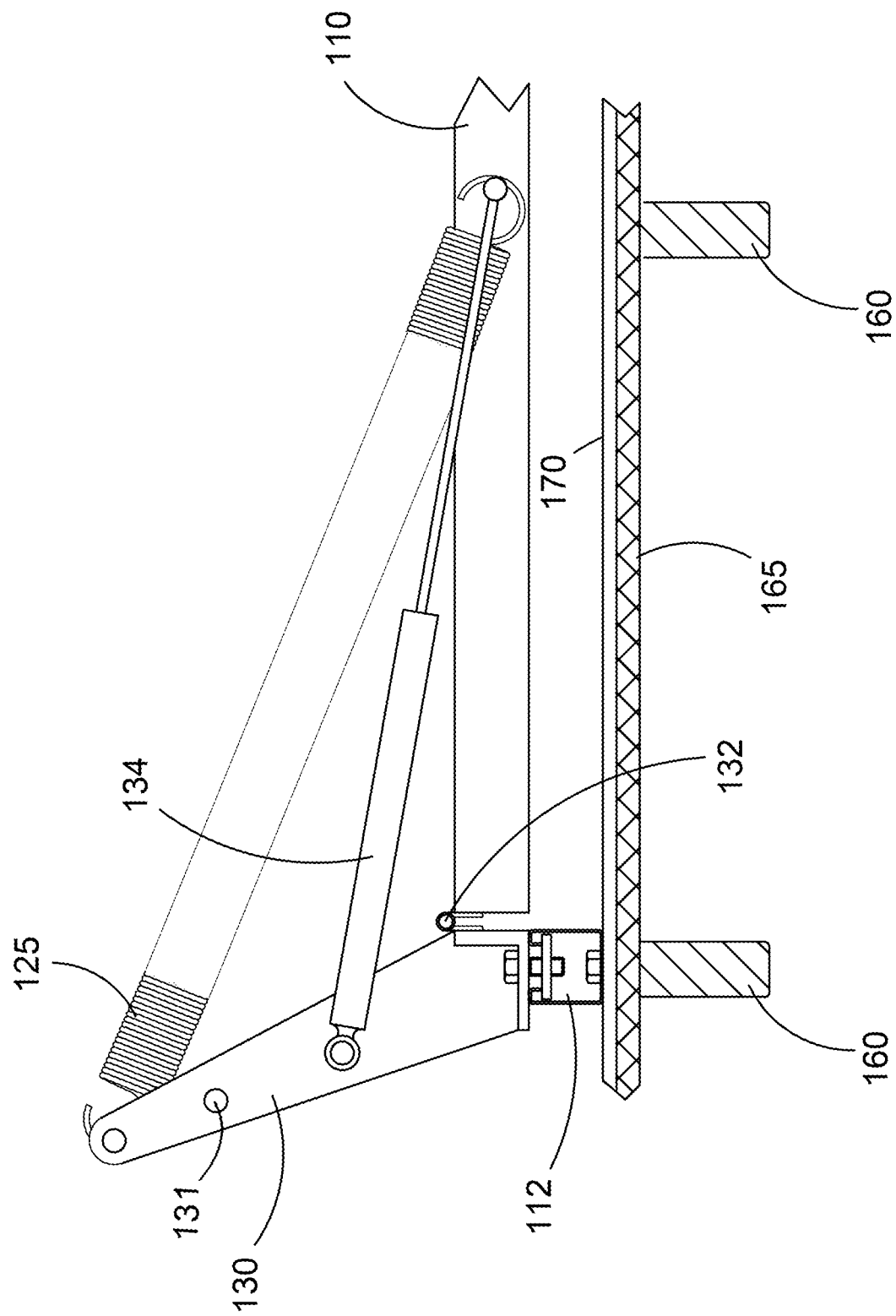
FIG. 6 shows a side view detail of a spring, damping shock absorber, hinge pivot and spring mounting bracket.

In yet another embodiment, a mounting point on the spring bracket 130 for the spring 125 is selectable or variable to allow selection of either a first two-position installation comprising the operative and vertical positions, or a second two-position installation comprising the operative and folded positions. In FIG. 6 an alternative mounting point is shown 131. In yet another embodiment, a third installation option is provided comprising the operative, vertical and folded positions. In this embodiment, a moving frame assembly 110, when placed in the vertical position, remains in that position, if not moving, as described above. However, a frame rotating from the operational position, comprising kinetic energy, will pass through the vertical position and continue to the folded position. In this embodiment, the vertical position may be called, "meta-stable."

In yet other embodiments, cams or additional pivot points may be used to adjust or select rotational torques and damping to effect desired forces on the moving frame assembly 110. One or more cams may be attached to the pivot axis, where the cams compress a leaf spring or activate another spring type. Cams and a leaf spring are not shown.

Figure 5:
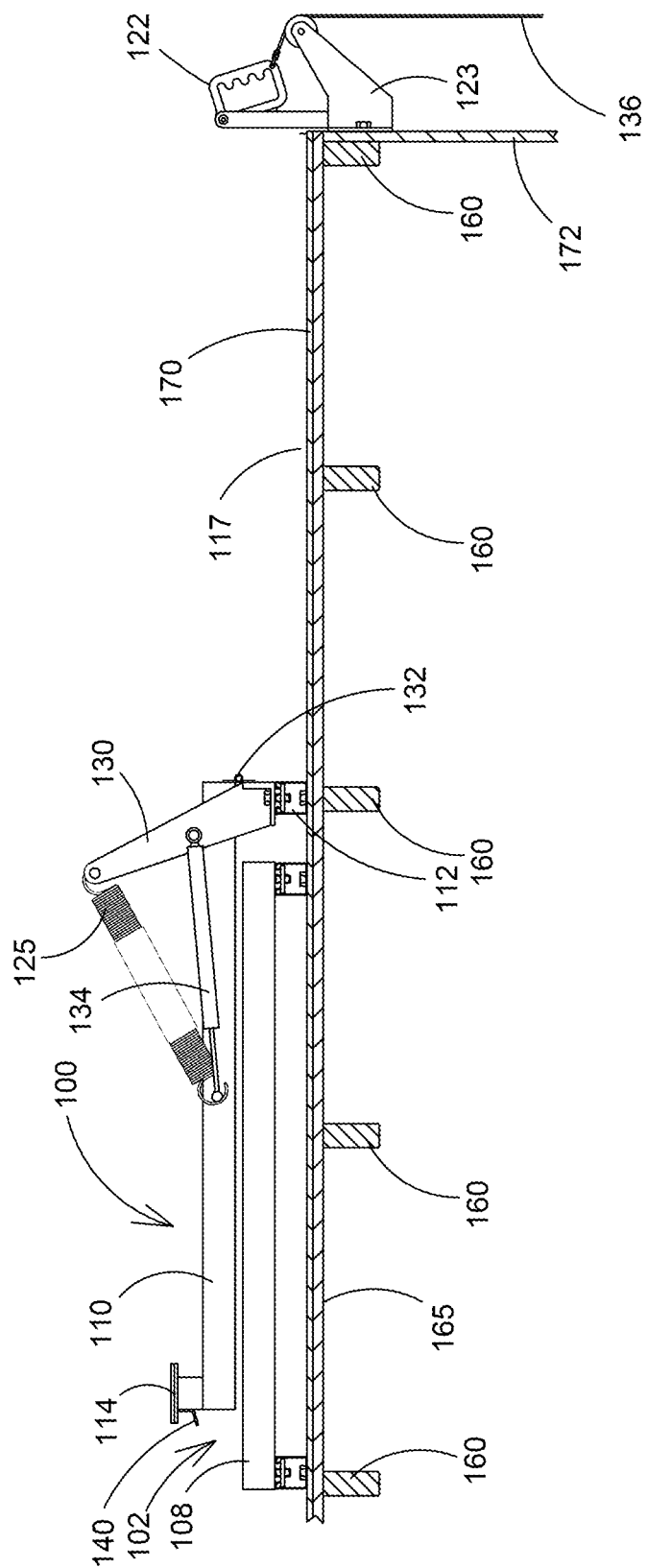
FIG. 5 shows a side view of a panel in a folded position.

Turning now to FIG. 5, we see a side view of an embodiment where the moving frame assembly 110 is in the folded position on top of an adjacent PV panel 108. Feet or bumpers, not shown, would typically be used to assure that the moving frame assembly 110 does not damage adjacent PV panel 108 as it moves into the folded position. Such feet or damper may be affixed to either the adjacent PV panel 108 or the adjacent PV panel 108. Dampers may be as simple as rubber blocks or hollow air-filled rubber dampers or isolation mounts. Such dampers may also be or comprise a spring.

If a solenoid is used to implement a remote release of an embodiment, it may be mounted with one end of the solenoid operatively coupled to the release handle 122 and the other end operatively fixed to the roof, typically through some intermediate structure such as a mounting bracket 123. A pulse of current through the solenoid causes the release handle 122 or release latch to move, releasing the moving frame assembly 110 from the latch 140. Such a release solenoid may operated via a mechanical cable, such as 136, or electrical wiring, or electronically.

An electrical circuit needed to operate a safety system must be highly reliable, typically with a 10 to 30 year life with very little or no maintenance. Generally, steel parts should be stainless steel or galvanized or painted to prevent rust. Aluminum may be used; typically it is anodized. Brass or bronze may be used. Plastic and rubber parts may be used, but they should be made UV resistant. Painted PVC is suitable material, as are plastics such as high-density polypropylene, designed or coated to resist UV. Fiberglass may be a suitable material. Wood may be used, but is generally not a preferred embodiment.

Ideally, any electronics used in an embodiment, or as part of an installation or method, should have internal backup power to assure operation when primary power is not available. One embodiment uses a long-life primary battery, such as lithium, lithium-ion, lithium iron phosphate or alkaline cells designed for a 10-year minimum life. Another embodiment uses a rechargeable battery, connected to a power source to maintain a charge. Yet another embodiment uses non-battery energy storage such as a capacitor or super-capacitor. Ideally, two separate local power sources are used to provide backup if one fails or has exceeded its useful life. Note that for an emergency electric or electronic release of an embodiment, typically only enough energy has to be electrically stored for a single release for each embodiment on a single building.

Turning now to FIG. 6, we see a side view detail showing the moving frame assembly 110, spring 125, damper shock absorber 134, spring mounting bracket 130, spring mounting bracket support 112, hinge and hinge pivot axis 132, and roof elements. 131 shows an alternative mounting point for one end of spring 125. Reference designators in this figure are for the same-identified elements described elsewhere herein.

Figure 7:
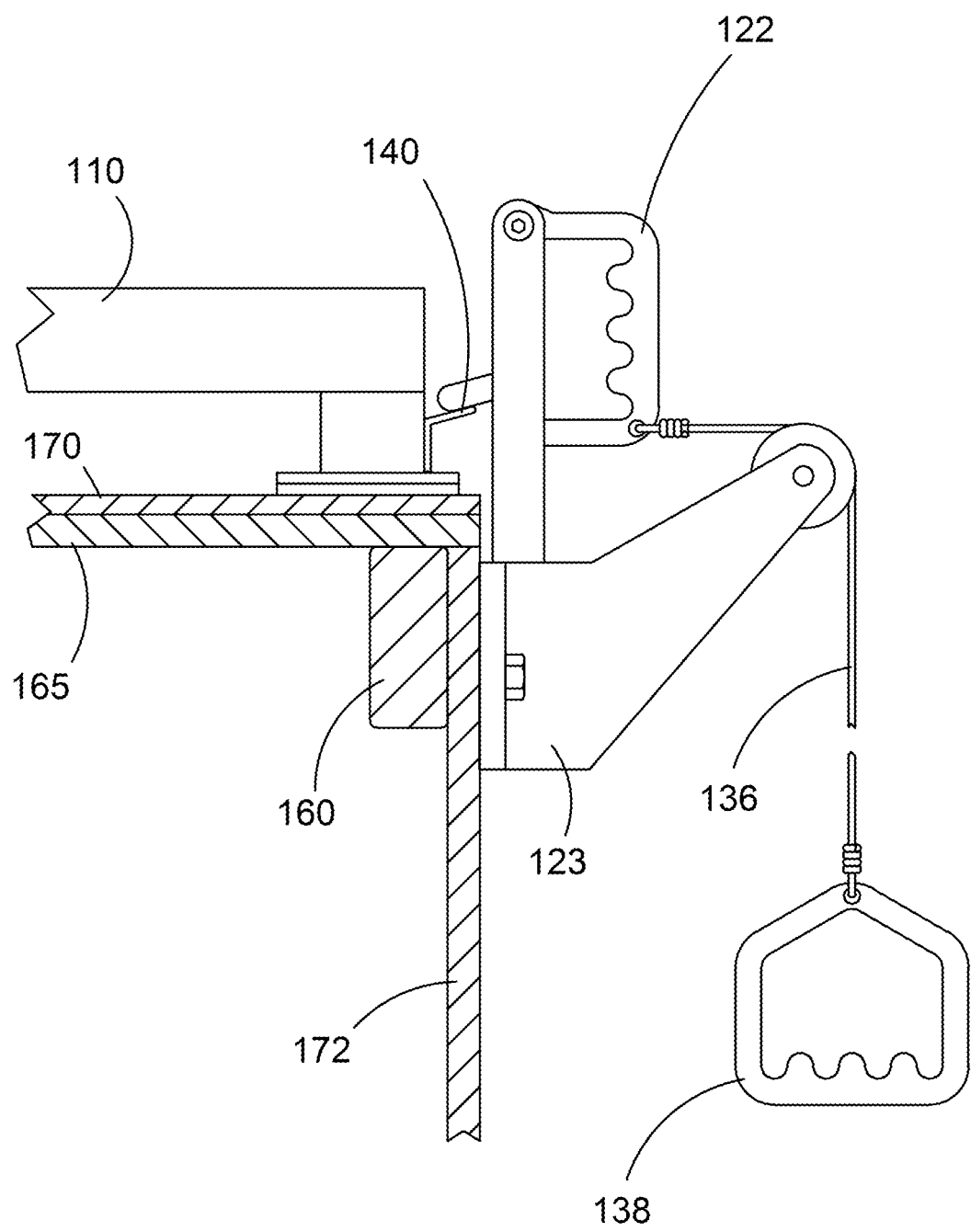
FIG. 7 shows a side view detail with a roof-mounted release handle and a wall-based release handle, and a latch.

Turning now to FIG. 7, we see a side view detail showing the release latch 140, roof release handle 122, cable 136, wall-accessible or ground accessible release handle 138, release handle mounting bracket 123, moving frame assembly 110, side wall 172, and roof elements. Reference designators in this figure are for the same-identified elements described elsewhere herein. Note the pin, projection or similar part of the release hand 122 holds the latch 140 in the latched position, The angles on the pin and the release latch are such that the some pressure is needed, such as by pulling on release handle 122 or 138, to compress a portion of the handle, latch 140, moving frame assembly 110, or feet 140 to permit a full release. This prevents an accidental release. Angles, position and length of these elements may be selected to create a desired pull-force on a handle needed to release the moving frame assembly 110 from its operational position. A pull force range may be 3 pounds to 50 pounds, or a range of 10 pounds to 30 pounds. A pivot point for release handle 122 is shown at the upper left of the handle in the Figure. Handles ideally are bright red and suitably labeled for emergency use, such as "EMERGENCY pull handle for roof access."

Figure 8:
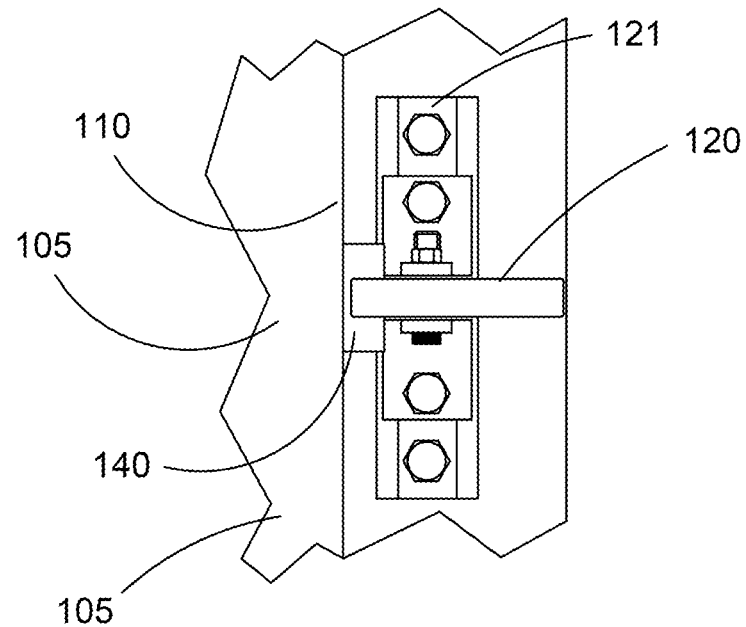
FIG. 8 shows a top view detail of roof-mounted release assembly.

Turning now to FIG. 8, we see a top or plan view of an embodiment of a release assembly. This assembly may be mounted on the roof or off the edge of a roof. 110 shows an edge of the moving frame assembly. 121 is the roof release handle support. 120 is the roof release handle assembly, including release handle 122. 140 is the release latch. Hexagonal heads of bolts are visible to secure the roof handle assembly to the roof, roof extension, parapet, or wall. Embodiments include other methods of mounting. For example, struts may be used. Release handles may be various shapes and may be located at various points in an embodiment or installation. Release handles may use slides, cables or a compliant material in place of a handle pivot. Other intermediate elements may be used, such as brackets, extensions, bars, pins, cables, rope, chains, belts, gears and the like.

Figure 9:
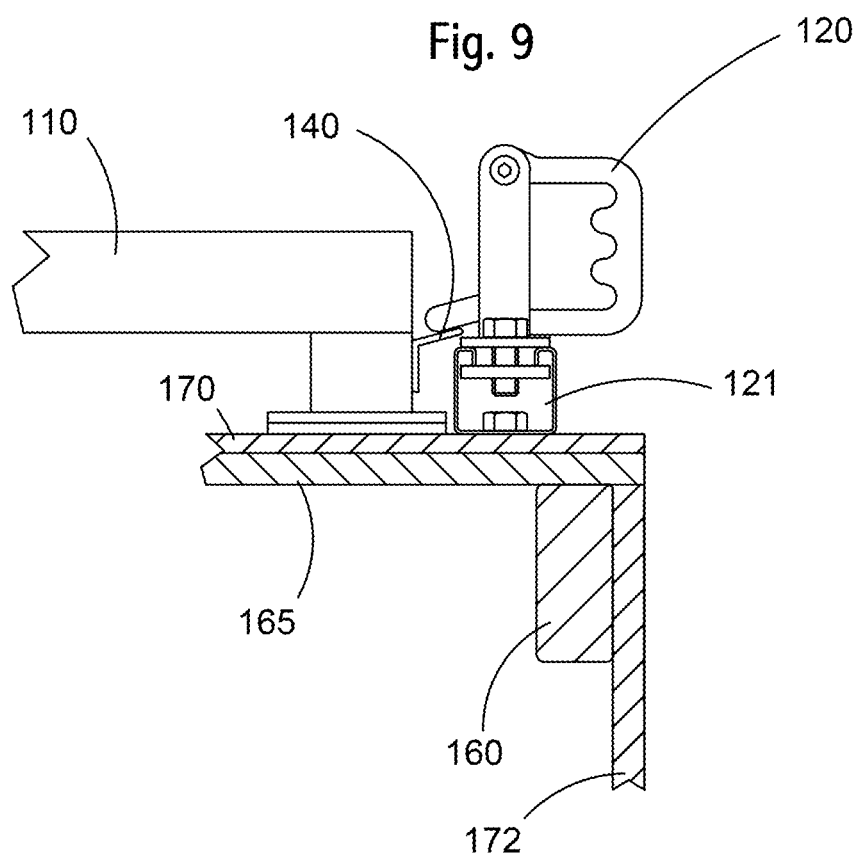
FIG. 9 shows a side view detail of roof-mounted release handle.

Turning now to FIG. 9, we see a side view of an alternative embodiment of a release handle and latch assembly. Reference designators in this figure are for the same-identified elements described elsewhere herein.

Figure 10:
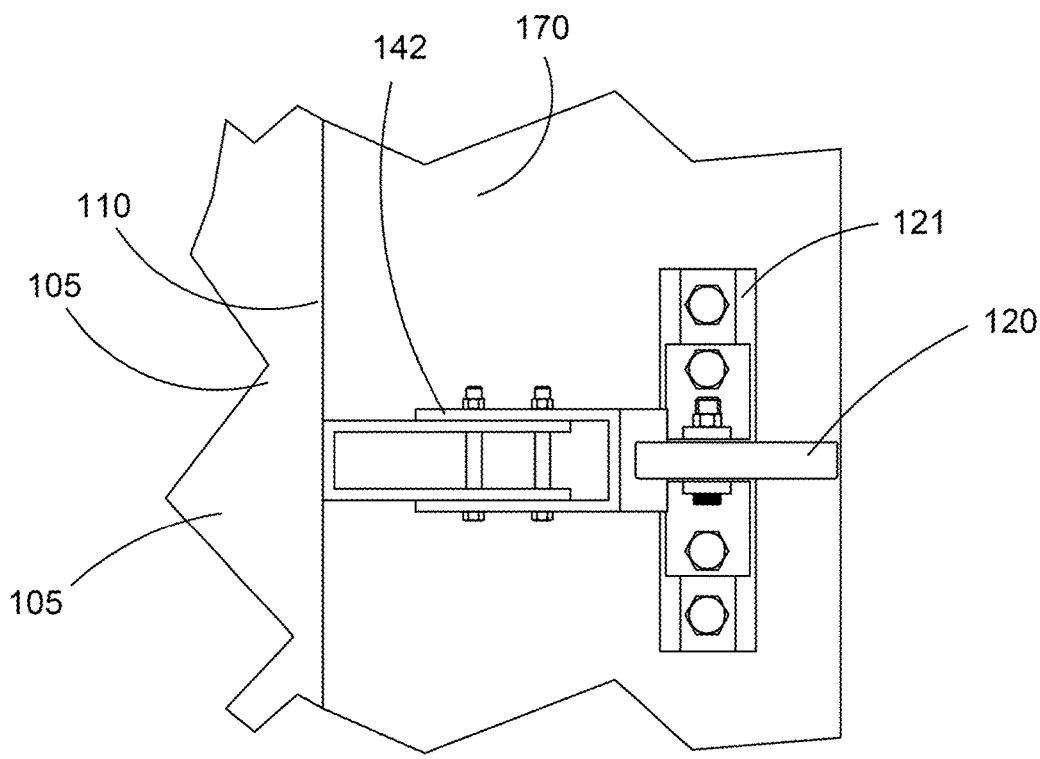
FIG. 10 shows a top view of a roof-mounted release assembly.

Turning now to FIG. 10, we see a top view an alternative embodiment of a release handle and latch assembly using an adjustable release extension 142. Reference designators in this figure are for the same-identified elements described elsewhere herein. Here, an extension bar or assembly 142 is used to allow the latch and release handle to be farther from the edge of moving frame assembly 110. Note that the latch may be located at either end, or in the middle of extension assembly 142. In the embodiment shown, the length of the extension assembly 142 is adjustable to allow desired positioning of the release handle relative to the moving frame assembly 110. It is desirable to keep as much of the roof free of obstructions, particularly near the edge.

Figure 11:
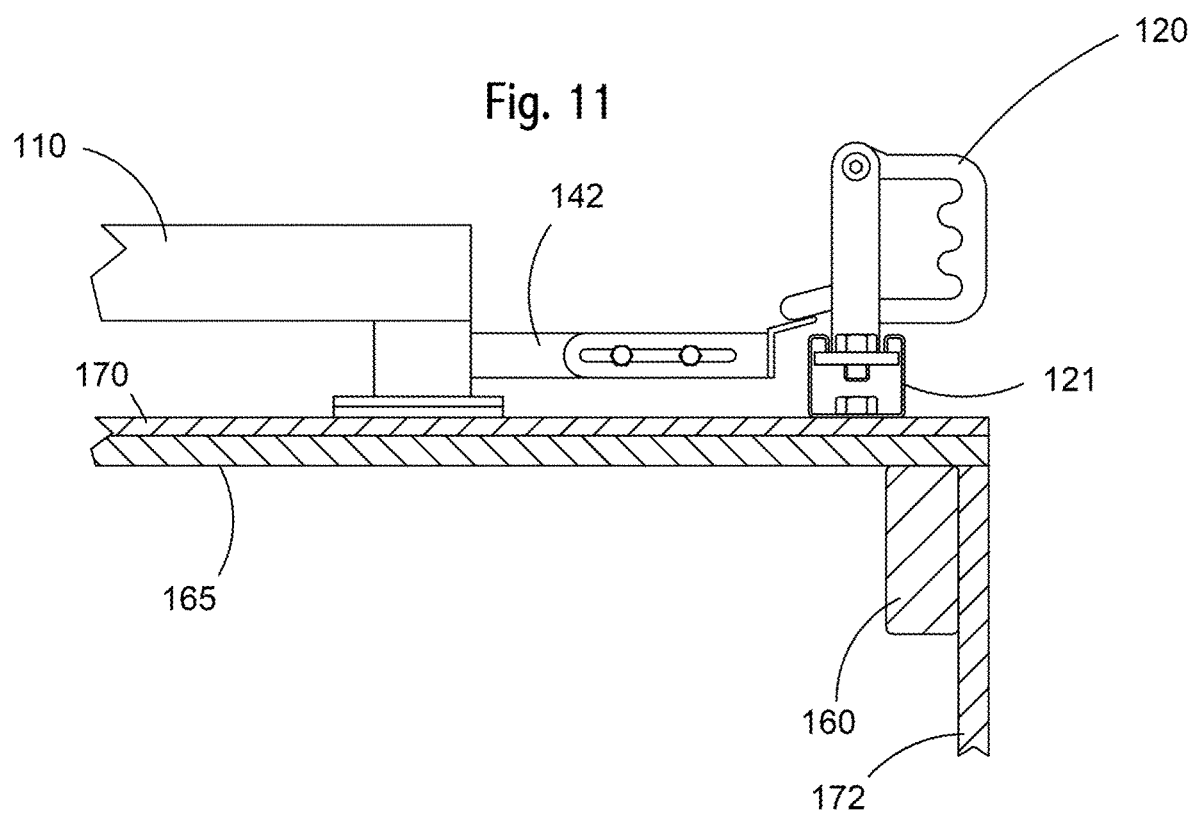
FIG. 11 shows an alternative embodiment side view using a release extension bar.

Turning now to FIG. 11, we see a side view of the embodiment shown in FIG. 10. Reference designators in this figure are for the same-identified elements described elsewhere herein.

Additional latches, mounts, bumpers or similar elements may be employed along the edges, corners or center between the fixed frame and the moving frame assembly 110 to assist in restraining motion of the fixed frame in the operative position.

Please note that PV panel arrays are typically installed on a sloped roof, or on a support structure such that the fixed array is sloped, ideally such that a midday sun angle is normal to the panel active surfaces. The terms "plan view," "top view," and "vertical" use as a reference plane the plane of the PV panels, rather than horizontal relative to the earth.

Embodiments in figures show hinges 132, which create a rotational pivot axis around which the moving frame assembly 110 rotates from an operative position to vertical or folded position to provide unobstructed roof access. Such hinges may comprise any element or combination of elements that effect or allow such a rotation. They may be a traditional barrel hinge, with a pin and a sleeve or knuckle that create a mechanical bearing with one degree of freedom. A single hinge may be used, such as a piano hinge, or any number of individual hinges. Three hinges 132 are shown in the figures. Any element that creates an axis of rotation for the moving frame assembly 110 may be used as a hinge or hinges. For example, a hinge(s) may be constructed of a flexible material. Such hinges are well known, such as are commonly used to secure caps on containers of liquid consumer products. Hinges have many different physical structures and names, such as barrel hinge, spring hinge, pivot hinge, butt/mortis hinge, flex hinge, case hinge, piano hinge, concealed hinge, butterfly hinge, flag hinge, strap hinge, H hinge, HL hinge, auto car door hinge, countertop hinge, flush, coach, rising butt, double action spring hinge, double action non-spring hinge, cranked hinge or stormproof hinge, lift-off hinge, coil spring, spiral torsion spring, extension spring, and self-closing hinge. Note that some hinges such as those used commonly on car doors and cabinet doors, contain multiple individual elements and more than one internal rotation. Nonetheless, they operate to create an axis of rotation, and are included in our definition of hinge. In addition, some hinges have an axis of rotation that shifts slightly during operation, such as cabinet hinges. Despite the shifting axis of rotation, we still included in these our definition of hinge.

The hinge(s) 132, ideally, permits approximately 180° of rotation of the moving frame assembly 110. However, only 90° or somewhat less is the minimum requirement. The moving frame assembly 110 must rotate enough to provide the desired roof access. Variations in rotational angles are design choices. Embodiments may permit or require the moveable frame to be mounted above adjacent panels in the larger array to permit the moving frame assembly 110 to sit flat, or nearly flat, on the adjacent array in the folded position. Such an offset may also permit the panel frame to not interfere with an adjacent panel in the larger array when raised to an access position. Embodiments do not need to be coplanar with a fixed PV array on the same roof. An axis of rotation may be near a lower edge of a moving frame assembly 110 or PV panel or near an upper edge, noting that this affects the location of the moving frame 110 in both an access and folded positions. In FIG. 1, we also see a portion of a release handle assembly 120. Suitable materials for hinges include brass, stainless steel, and flex plastic. High-strength aluminum may be used. Suitable outdoor-rated, UV-resistant plastics include HDPE, PTFE, PCTFE and ECTFE. For a flex hinge, UV-resistant polypropylene PP or polyethylene PC may be used. Note that the hinge needs appropriate strength to handle the unbalanced weight of a PV panel and its associated moving frame assembly 110. Counterweights, flywheels, or additional springs may be used to reduce the otherwise required torque to lift a moving frame 110 from the operative position.

Suitable materials for mechanical elements include steel, aluminum, and structural plastic, such as glass-reinforced molded or extruded plastic. Carbon fiber or fiberglass may be used. Steel should typically be stainless steel, plated, galvanized or painted. Aluminum may be anodized. Plastic elements should be UV resistant.

Many different types of springs may be used. Shown in figures are conventional steel extension spring with loop ends. A compression spring may be used with a different mounting arrangement. For example, a compression spring could be located between the fixed frame and the moving frame, wherein it is compressed in the operative position and natural, or extended, in the vertical or other access position. Alternatively, one or more torsion springs could be used.

The centerline of conventional torsion spring(s) may be close to a rotational axis point, or the axis or pivot of the hinge(s). Such a rotational axis point is shown approximately at point 132 in FIG. 3. Leaf springs may be used in an alternative embodiment. In one embodiment, one or more springs "throw" the moving panel from the operative position to an approximately vertical or other access position. That is, the spring provides an initial rotating torque, with the moving frame assembly 110 then continuing via rotational inertia to a vertical or other access position. This is not a preferred embodiment, as the PV panels are heavy and ideally should not move rapidly, due to a risk of injury or damage. In another embodiment, a counter-weight may be used in place of or in addition to a spring. For example, a counterweight may extend off the edge of a building or off the edge of a support structure. A counterweight may be lower cost than springs, but would require a more customized installation. For the purpose of claim construction, such a counterweight should be considered a "spring" as it generates a rotational torque on the moving frame 110. In this embodiment, potential energy to rotate the moving frame is supplied by gravity, rather than a metal spring or compressed gas. For implementation, a cable from such a counterweight could be secured to the moving frame assembly 110 at the same point as shown in FIG. 3 with a pin shown at the movable end of spring 125. In FIG. 6 an alternative mounting pin location 131 is shown. The cable 136 would continue over an edge of a roof or panel array support structure, via a pulley or curved running surface.

In yet another embodiment, a spring comprises compressed gas, such as in a cylinder or bag. Although simple, such an embodiment may suffer from leakage of the gas. A compressed gas cylinder may operate either as an extension spring or compression spring. A vacuum or partial vacuum may be used in place of compressed gas.

Yet another embodiment uses a "single-use" gas canister as the source of potential energy for a spring. This embodiment may not suffer from gas leakage, but the gas canister would need to be replaced after each emergency use. Yet another embodiment uses a squib to provide the motive force or torque for rotation. Note that, like a fire extinguisher, single use appliances may be acceptable due to the infrequency of fire emergencies. The term, "spring," needs to be broadly construed to include any element that provides a rotational force or torque on the moving frame, directly or indirectly, to cause it to move from an operative position to an access position, such as vertical or folded.

A damping element may comprise a cylinder, such as a shock absorber or dashpot; the damping element may be positioned similarly to the spring 125. Such a damping element may be located to the side of the spring (as viewed from the side), or inside the spring, or surrounding the spring. In one embodiment, the damping element is a dashpot open or partially open to the air. The dashpot may be made of stainless steel, anodized aluminum, or UV resistant plastic. An open dashpot should be protected against accumulating water, dirt, and animals. A damper, such as 134, is a critical part of embodiments, as it prevents a moving frame assembly 110, with a PV panel, from rotating so fast as to risk injury or damage. A damper is a physical element, although embodiments of this element may vary significantly.

In one embodiment, a spring comprises one or more leaf springs. One or more cams may be positioned such that rotation of the moving frame causes a cam to depress the leaf spring when the moving frame is in the operative position and not depress the leaf spring when the moving frame is in the access position. The force of the leaf spring against the cam is the force that rotates the moving frame away from the operative position. The cam may be directly or indirectly affixed to the moving frame. The ends of the leaf spring are directly or indirectly affixed to the fixed frame. The center of the leaf spring is free to be deflected by the cam. The cam, surface of the leaf spring, or an intermediate element may comprise a self-lubricating material, such as Nylon or another synthetic polymer, polypropylene, and the like.

In describing embodiments, terms are often used that may be construed as either structural elements or an element that provides a means to a function. For example, the term, "spring," may describe either an element or a function. In general, elements in device claims should be construed as an element, not a function. However, under the rule of equivalents, a similar device that performs a similar function for the same purpose is also within the scope of a claim. However, the full context of any term is required for proper construction. In general, terms should be construed using terms of the art, which is typically mechanical structures, unless otherwise specified herein.

From a practical viewpoint, embodiments may be constructed, distributed, sold and installed in various levels of assembly or completeness. For example, one embodiment may include a PV panel, while others do not. As another example, one embodiment may include all elements of a fixed frame to attach to a roof, while another embodiment may include few elements or almost no stand-alone mounting elements, as these may provided from an existing PV array or by an installer, who may standard mounting hardware. In such embodiments, a "fixed frame" comprises those elements that do not move when the moving frame 110 rotates. Proper construction of claimed embodiments must have the flexibility to cover various commercial product implementations. A goal is to have construction of claims include embodiment and product variations where various standard mechanical elements are left out. In such cases, an installer or user might easily acquire such standard elements from another source.

A "fixed frame" element in a claim may include few or no struts; it may include only a spring mount. A fixed frame may be part of embodiment or product. Or, a fixed frame may be separate from an embodiment or product, such a portion of fixed PV array, roof, or static mechanical hardware attached to a roof.

A moving frame element or moving frame assembly may include few structural elements, as in some embodiments the frame around a PV panel makes up most of the moving frame. A moving frame may comprise only a portion of a release latch, for example, or attachment elements for a spring, damper or damping cable, or hinge mount elements. A claim term, "accepts a PV panel," should be construed to include embodiments where the PV panel itself is part of or most of a moving frame assembly 110.

A moving frame mechanically interfaces with a nominal fixed frame primarily through four elements: a hinge, a release latch, a spring, and a portion of a damper. These four "interface" elements may be construed to be predominantly part of either a fixed frame or a moving frame. Or, they may be separate elements, attached either during product manufacture or during installation to both the fixed frame and moving frame. Claims and claim elements should be construed to cover such practical variations in products.

Photovoltaic panel arrays require installation. Installers use a set of parts to install arrays, such as struts, bolts, and PV panels. Embodiments of this invention may be provided to installers in a wide range of assembly options, from nearly complete assembly to a kit of many individual elements. It is the intent of proper claim construction to maintain claim breadth over this full range of pre-assembly or loose parts of claim elements. Mechanical variations that achieve the same result by the same method are included in proper construction of claims.

In some applications it is desirable to know remotely the position of the moving frame assembly 110. Therefore, some embodiments include one or more electrical switches or electronic sensors that are responsive to the position of the moving frame assembly 110, or latches, springs, release triggers, dampers, or handles. Sensors may detect motion directly, rather than position.

Another embodiment detects motion of the moving frame assembly 110. For example, such a switch or sensor could be connected to an alarm, which then sounds locally or remotely anytime the moving panel moves between these two positions. In one embodiment, a switch is attached to or is part of the release handle or the release latch. In some embodiments, a switch or sensor that is responsive to the moving frame assembly 110 connects to a PV controller such that at least the PV panel attached to (or part of) the moving frame assembly 110 is electrically disconnected from an electrical grid or other electrical wiring.

In one embodiment, a PV panel mounted in the embodiment is electrically disconnected automatically when a moving frame assembly 110 is raised from an operative position. For example, one half of an electrical connector may be securely mounted, directly or indirectly, on a fixed frame or roof. The other half of the electrical connector may be mounted, directly or indirectly, on the moving frame assembly 110. When the moving frame assembly 110 is rotated from the operative position, the connector opens. When the moving frame assembly 110 is rotated down to an operative position, the connector is closed. In this way, a firefighter achieves both access to a portion of a roof and disconnects the panel with a single action of a release handle 122 or 138.

In yet another embodiment, the "fixed frame" is any combination of elements needed for the embodiment to function as intended that are not fully part of the moving frame. For example, a fixed end of a spring or fixed end of a damper. These may be mounted on, directly or indirectly, to another PV panel, such as one that is part of a fixed PV array.

In yet another embodiment, a release handle electrically disconnects a full PV array from a power grid. Such a disconnection may be directly in series with the electrical wiring of the full panel array, or it may activate a control input to a PV panel electrical controller. This has an obvious convenience and safety benefit during a fire emergency.

In one embodiment, an electrical-disconnect lever functions additionally as a release handle.

Additional Embodiments

Some embodiments comprise more than one release latch, or more than one release trigger. Examples of release triggers include: (i) a release handle located proximal to or in the roof access region; (ii) a release handle proximal to or on an edge of the roof; (iii) a release handle on a side of the building comprising the roof, where such a release handle may be accessible to emergency personnel on the ground; (iv) a release handle proximal to or part of a photovoltaic panel controller, sometimes referred to as an inverter, wherein the release handle both cuts power to a photovoltaic array and generates a release trigger to the embodiment; (v) a release handle that provides both a release trigger to the embodiment, and a separate output signal to a photovoltaic panel controller, sometimes referred to as an inverter, for the purpose of disconnecting power to a photovoltaic array; (vi) a signal provided by or generated from emergency personnel; (vii) an output from a fire alarm or fire warning system.

A release trigger, or an actual release of a fixed frame from its operational rotational position, in some embodiments, also generates a separate output signal to a fire alarm or fire warning system.

A release trigger may be wireless, although wired is preferred.

A release trigger may be through a power connection sharing at least one wire with electrical connections from a PV panel mounted on the fixed frame.

Mechanical connections from a release trigger to an embodiment may comprise a mechanical wire, cable, bar, rod or pin, which may be pushed, pulled or rotated to effect the trigger.

Electrical release triggers or release mechanisms on or proximal to the fixed frame or rotating frame may comprise a solenoid, two solenoids, piezoelectric transducers, a motor, memory wire, or a fuse.

A release trigger may comprise a heat-sensitive element, such as a bi-metal strip or a meltable element, that releases or triggers when exposed to a temperature above a predetermined trigger temperature.

A fire alarm or fire warning system may comprise a smoke detector, heat detector, or fire sprinkler.

A rotational damper may comprise a shock absorber, which may be similar to a shock absorber or strut such as commonly used in automobiles. A spring, damper or both may comprise a gas-filled cylinder. A rotational damper may comprise a fluid-filled cylinder. A rotational damper may comprise one or more friction elements, which provide rotational damping from friction. A rotational damper may comprise a rotational speed governor, such as a Porter governor, or other dampers known in the art such as described in https://en.wikipedia.org/wiki/Governor_(device), such a retrieved on 10/10/2019. A rotational damper may comprise a flywheel.

Some building codes, safety codes, or fire codes may require portion of a roof to be free of obstructions such that emergency personnel, such as firefighters may safely access a region of a roof. It is an intent of embodiments to provide such an unobstructed roof access region in an emergency, while providing space for an operative PV panel prior to the emergency. Some building codes require at least a 36-inch or 48-inch wide access region as measured from an edge of a roof to a nearest obstruction, or as measured from any roof penetration. Some embodiments, including devices, methods and systems, mount embodiments such that when the moving frame is in a second position that a roof access portion then meets the associated building, safety or fire code. Note that building codes may or may not permit installation of embodiments described in the disclosure of this application. Access regions on a roof may be 36, 48, at least 36 or at least 48 inches between a roof edge and a nearest point of an embodiment, or between a roof penetration or other obstruction and a nearest point of an embodiment. Such spacing may be in the range of 20 inches to 72 inches, or 30 inches to 60 inches, or 32 to 40 inches, or 44 to 52 inches.

For typical, prior art PV panel installations: that is, not using an embodiment of this invention, mounting hardware and methods comprise first mounting a grid of struts on the roof, typically aligned with roof joists, then securing PV panels at multiple points to the struts. For example, PV panels may be secured at four points, six points, eight points, and the like.

For embodiments of this invention, it is necessary to leave the roof free of obstructions when the embodiment is in a second rotational position. Therefore, there cannot be permanently mounting elements underneath the embodiment that form roof obstructions, at least for a portion of the embodiment. Therefore, in one embodiment, only one edge or side of the embodiment is secured, directly or indirectly, to the roof. Feet on the embodiment are used to provide support for the embodiment and its associated PV panel, where the feet rest on the roof on the operative position and then are raised with the moving frame when it rotates. Feet may be compliant, such as solid or hollow rubber. However, feet are not necessary compliant. Feet may comprise springs or a springy material. There may be one foot, two feet, three feet, four feet, or another number of feet. Feet may be at one or more specific points on the moving frame, or they may be elongate, such as on at least a portion of an edge of the moving frame.

An embodiment may have more than one release trigger. It is preferred that any release trigger causes release of the moving frame with no additional triggers or conditions. However, in some embodiments, two or more separate triggers may be required in sequence or in tandem to cause release. One trigger may be viewed as "arming" the release and the other as "firing" the release. This permits, for example, a maintenance, installation or test mode where the firing release is effectively disabled by having the arming release in a non-armed state. Embodiments include multiple release triggers or release latches, activated by a single source such as a pulling a single release handle, where the multiple release triggers or release latches cause more than instantiation of an embodiment to move away from their respective operational positions. Embodiments may have a both an "input release trigger" and an "output release trigger." Wiring for multiple instantiations of embodiments may be wired in a parallel or a series configuration, where the wiring is mechanical, electrical, or electronic. Embodiments includes multiple moving frames, each with a respective PV panel, wherein they are interconnected as described.

Building codes may refer to an "obstruction" or an "obstructed roof." Generally, this refers to a portion of roof that is not free to be walked on safely by personnel, such as firefighters. PV panels and their support elements, such as roof-mounted struts, are such obstructions. They may "obstruct," "cover," "restrict" or "block" a portion of a roof or access to a portion of a roof. Embodiments, in an operational position, are construed to be such an obstruction. Embodiments, in a vertical or folded position, are construed to not obstruct.

"Affixed to" and its equivalent language is construed to mean mechanically attached, directly or indirectly. For example, a roof may have a sequence of elements, such as roof struts, and thereon PV panel mounting struts, and thereon a fixed PV panel. A roof is likely to be a "support structure" of embodiments. One end of a spring, hinge, latch or damper of embodiments may be directly attached to the fixed PV panel. Such an arrangement is construed to include "attached to the support structure."

For convenience of discussion, a "latch" is an element, mechanism or portion of a mechanism that physically releases an embodiment from an operational position. A "release trigger" is an element, mechanism or portion of a mechanism that physically causes the latch to release. A latch and release trigger may be integrated into an element or mechanism. A handle may be a release trigger or may cause action of release trigger. Embodiments may have more that one latch, more than one release trigger, and/or more than one handle. Additional latches or handles may be used to hold or release the moving frame from positions other than operational.

A "roof access region" is any portion or portions of a roof that are obstructed by an embodiment in an operational position and not obstructed in a vertical or folded position. An "access position" for a moving frame is any position, such as vertical or folded, non-exclusively, that does not obstruct the roof access region. In some embodiments, a "first rotational position" is the operative position of the moving frame and a PV panel affixed to the moving frame.

Non-limiting embodiments include:
two stable positions: operational and vertical;
two stable positions: operational and folded;
three stable positions: operational, vertical and folded;
a vertical position that is an interim, non-stable position between operational and folded;
a vertical position that is a meta-stable position wherein movement caused by a release trigger operation causes the moving frame to pass through the vertical position when moving from the operational position to the folded position, without stopping at the vertical position; and also where if the moving frame is placed still in the vertical position it will stay in the vertical position;
pre- or post-installation selection of any combination of two or more of the above embodiments, for example, by a user, owner, distributer, installer, or maintenance personnel. For example, a spring or damper may be connected at one or more alternative mounting points, such as 131 in FIG. 6.

Embodiments may include one or more sensors or indicators to identify or indicate status of: a release latch, release trigger, handle, position of moving frame; operational status of the spring, operational status of the damper, operational status of a power connection of PV panel attached to the moving frame, operational connection to an alarm system, functional connection to a remote release trigger, wherein such connection is wired, wireless, optical or acoustic. Indicators may be local or remote. Sensors may be mechanical switches, proximity detectors, optical sensors, hall-effect sensors, magnetic sensors, motion sensors, electrical voltage or current sensors, and the like.

A "moving frame" and a "moving frame assembly" are synonymous, unless otherwise clear from the text or context. Additional embodiments include:

1. An embodiment wherein:
   the spring comprises an extension spring.
2. An embodiment wherein:
   the spring comprises one or more coiled extension springs.
3. An embodiment wherein:
   the spring comprises one or more spiral torsion springs.
4. An embodiment wherein:
   the spring comprises a compressed gas.
5. An embodiment wherein:
   the spring comprises a leaf spring.
6. An embodiment further comprising:
   a cam, wherein the cam rotates with the moving frame such that the cam depresses the (or a) leaf spring when the moving frame is in the first position.
7. An embodiment wherein:
   the spring, moving frame, damper or embodiment comprises a counterweight.

8. An embodiment wherein:
   a distance from an edge of a roof comprising the roof access region to a closest portion of the fixed frame is at least 36 inches.
9. An embodiment wherein:
   a distance from a penetration through roof comprising the roof access region to a closest portion of the fixed frame is at least 48 inches.
10. An embodiment further comprising:
    at least one foot attached to the moving frame wherein the at least one foot is adapted to rest on the roof of the roof access region when the embodiment is in the first rotational position.
11. An embodiment adapted to be partially or fully installed on a separate support structure, such as existing roof struts or an existing PV panel portion:
    in this embodiment, the "fixed frame" is any combination of elements needed for the embodiment to function as intended that are not fully part of the moving frame; for example, a fixed end of a spring or fixed end of a damper. These may be mounted on, directly or indirectly, to another PV panel, such as one that is part of a fixed PV array.
12. The device of claim 1 wherein:
    the release trigger further comprises an electrical output that indicates the state of the release trigger as unreleased or released.
13. A method of providing, in an emergency, a roof access region clear of obstructions, comprising the steps:
    mounting a device of claim 1 on a roof comprising the roof access region;
    activating the release trigger.
14. A method of providing emergency roof access through a photovoltaic roof array comprising the steps of:
    mounting the device of claim 1 on a roof;
    manually moving the release handle in a first motion.
15. A kit of comprising the elements of an embodiment described elsewhere in the disclosure of this application.
    Ideal, Ideally, Optimal and Preferred—Use of the words, "ideal," "ideally," "optimum," "optimally," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.
    All examples are sample embodiments. In particular, the phrase "invention" should be interpreted under all conditions to mean, "an embodiment of this invention." Examples, scenarios, and drawings are non-limiting. The only limitations of this invention are in the claims.
    May, Could, Option, Optional, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.
    Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims. Claims for devices and systems may be restricted to perform only the methods of embodiments or claims.

I claim:

1. A device to rotate a photovoltaic (PV) panel comprising:
   a moving frame, configured to receive the PV panel, and configured to rotate around a pivot axis, comprising a first rotational position and a second rotational position;
   a hinge, comprising the pivot axis, operatively connected between the moving frame and a support structure;
   a spring operatively connected between the moving frame and the support structure;
   a rotational damper operatively connected between the moving frame and the support structure;
   a release latch operatively connected between the moving frame and the support structure;
   a release trigger operatively connected to the release latch;
   wherein the moving frame is configured to rotate around the pivot axis from the first rotational position to the second rotational position;
   wherein the spring provides a rotational torque on the moving frame from the first rotational position to the second rotational position;
   wherein the damper provides rotational damping of the moving frame;
   wherein the release latch holds the moving frame in the first rotational position until released by an operation of the release trigger; and
   wherein the moving frame obstructs a roof access region in the first rotational position and does not obstruct the roof access region in the second rotational position.

2. The device of claim 1 wherein:
   no other action other than the operation of the release trigger is necessary for the moving frame to rotate from the first rotational position to the second rotational position.

3. The device of claim 1 further comprising:
   one or more feet affixed to the moving frame;
   wherein the feet are located such that when the moving frame is in the first rotational position at least one of the feet is positioned against a roof comprising the roof access region; and
   wherein, when the moving frame is in the first rotational position, the at least one of the feet transfers a portion of weight of the device to the roof.

4. The device of claim 1 wherein:
   the first rotational position is parallel to a roof comprising the roof access region.

5. The device of claim 1 wherein:
   the second rotational position is 90 degrees rotated from the first rotational position; and
   the second rotational position is stable.

6. The device of claim 1 wherein:
   the second rotational position is 180 degrees rotated from the first rotational position; and
   the second rotational position is stable.

7. The device of claim 1 wherein:
the connection of the spring to the support structure is via a spring bracket affixed to the support structure; and
wherein the connection of the rotational damper to the support structure is via the spring bracket.

8. The device of claim 1 wherein:
the release trigger comprises a handle, wherein the handle is adapted to mechanically release the release latch when manually pulled.

9. The device of claim 1 wherein:
the release trigger is proximal to an edge of the roof access region.

10. The device of claim 1 wherein:
the release trigger is remote from a roof comprising the roof access region and is accessible to a person neither on nor proximal to the roof access region.

11. The device of claim 1 wherein:
the release trigger comprises an electrical solenoid, adapted to receive an electrical signal that operates the release trigger.

12. The device of claim 1 wherein:
the second rotational position is 180 degrees rotated from the first rotational position; and
wherein the rotational torque is a first rotational torque, and the spring provides the first rotational torque on the moving frame away from the first rotational position and provides a second rotational torque away from the second rotational position; and
wherein the second rotational position is stable.

13. The device of claim 1 further comprising:
a third rotational position 180 degrees rotated from the first rotational position;
wherein the second rotational position is 90 degrees rotated from the first rotational position;
wherein a spring bracket comprises a manual setting selecting either the second rotational position or the third rotational position as stable, wherein only one of the second and third rotational positions are stable.

14. The device of claim 1 further comprising:
a third rotational position 180 degrees rotated from the first rotational position;
wherein both the second and third rotational positions are stable.

15. The device of claim 1 wherein:
the device is a first device, further comprising:
an output release trigger adapted to release to a second, separate device, identical to the first device, wherein the output release trigger is the release trigger of the second device.

16. The device of claim 1 wherein:
the PV panel is a first PV panel, further comprising:
a power-disconnect output signal wherein the power-disconnect output signal is adapted to disconnect power to at least one of the first PV panel and a second PV panel identical to the first PV panel, located on same a roof on which the roof access region is located.

17. The device of claim 1 further comprising:
at least two handles, both of which are operatively connected to the release trigger;
wherein one handle is located on or proximal to the roof access region; and
wherein a second handle is located away from the roof access region and is accessible to a person on a ground surface.

18. A kit comprising the device of claim 1.

19. A method of providing, in an emergency, a roof access region clear of obstructions, comprising the steps:
mounting the device of claim 1 on a roof comprising the roof access region;
activating the release trigger.

* * * * *